United States Patent [19]

Lindig et al.

[11] Patent Number: 4,851,372
[45] Date of Patent: Jul. 25, 1989

[54] GLASS-CERAMIC WITH SPECIFIC THERMAL EXPANSION BEHAVIOR

[75] Inventors: Otto Lindig; Wolfgang Pannhorst, both of Mainz, Fed. Rep. of Germany

[73] Assignee: Schott Glaswerke, Mainz, Fed. Rep. of Germany

[21] Appl. No.: 933,254

[22] Filed: Nov. 19, 1986

Related U.S. Application Data

[63] Continuation-in-part of Ser. No. 737,007, May 23, 1985, abandoned.

[30] Foreign Application Priority Data

May 23, 1984 [DE] Fed. Rep. of Germany ....... 3419233

[51] Int. Cl.$^4$ .................... C03C 3/22; C03C 10/14
[52] U.S. Cl. ........................................ 501/4; 501/7; 501/55; 501/63; 501/67; 501/69; 501/70
[58] Field of Search ................. 501/7, 4, 55, 63, 67, 501/69, 70

[56] References Cited

U.S. PATENT DOCUMENTS

| | | | |
|---|---|---|---|
| 3,625,718 | 12/1971 | Petticrew | 501/7 |
| 3,834,911 | 9/1974 | Hammel | 501/7 |
| 3,907,577 | 9/1975 | Kiefer et al. | 501/7 X |
| 4,438,210 | 3/1984 | Rittler | 501/7 X |
| 4,461,839 | 7/1984 | Rittler | 501/4 OR |

FOREIGN PATENT DOCUMENTS

1596863 1/1972 Fed. Rep. of Germany .......... 501/7
1496611 2/1972 Fed. Rep. of Germany .

OTHER PUBLICATIONS

Jacobs, S. F., et al., "Dimensional Stability of Fused Silica and Several Ultralow Expansion Materials, Thermal Expansion Materials", Thermal Expansion-1973, AIP Conference Proceedings, pp. 280-296.
Bennett, S. J., et al., "An Absolute Interferometric Dilatometer", Journal of Physics E: Scientific Instruments 1977, vol. 10, pp. 525-530.
J. W. Berthold III and S. F. Jacobs, "Ultraprecise Thermal Expansion Measurements of Seven Low Expansion Materials" vol. 15, Oct. 1976, pp. 2344–2347.
Jacobs, et al., Appl. Opt. 23, 17, 3014 (1984).

*Primary Examiner*—Mark L. Bell
*Assistant Examiner*—Karl Group
*Attorney, Agent, or Firm*—Millen, White & Zelano

[57] ABSTRACT

Base-glasses for glass ceramics cotaining h-quartz solid solution crystals, with a maximum relative length variation of $1 \times 10^{-5}$ and a linear thermal expansion coefficient less than $0.1 \times 10^{-6}$/K, comprise (in weight percent) 50–65 $SiO_2$, 18–27 $Al_2O_3$, 0–10 $P_2O_5$, 0–1 $B_2O_3$, 2.5–4 $Li_2O$, 0–2 $Na_2O$, 0–2 $K_2O$, 0–0.5 MgO, 1–5 ZnO, 1–4 CaO, 1–5 BaO, 0–5 $TiO_2$, 0–3 $ZrO_2$ and 0–1.5 $As_2O_3$.

23 Claims, 1 Drawing Sheet

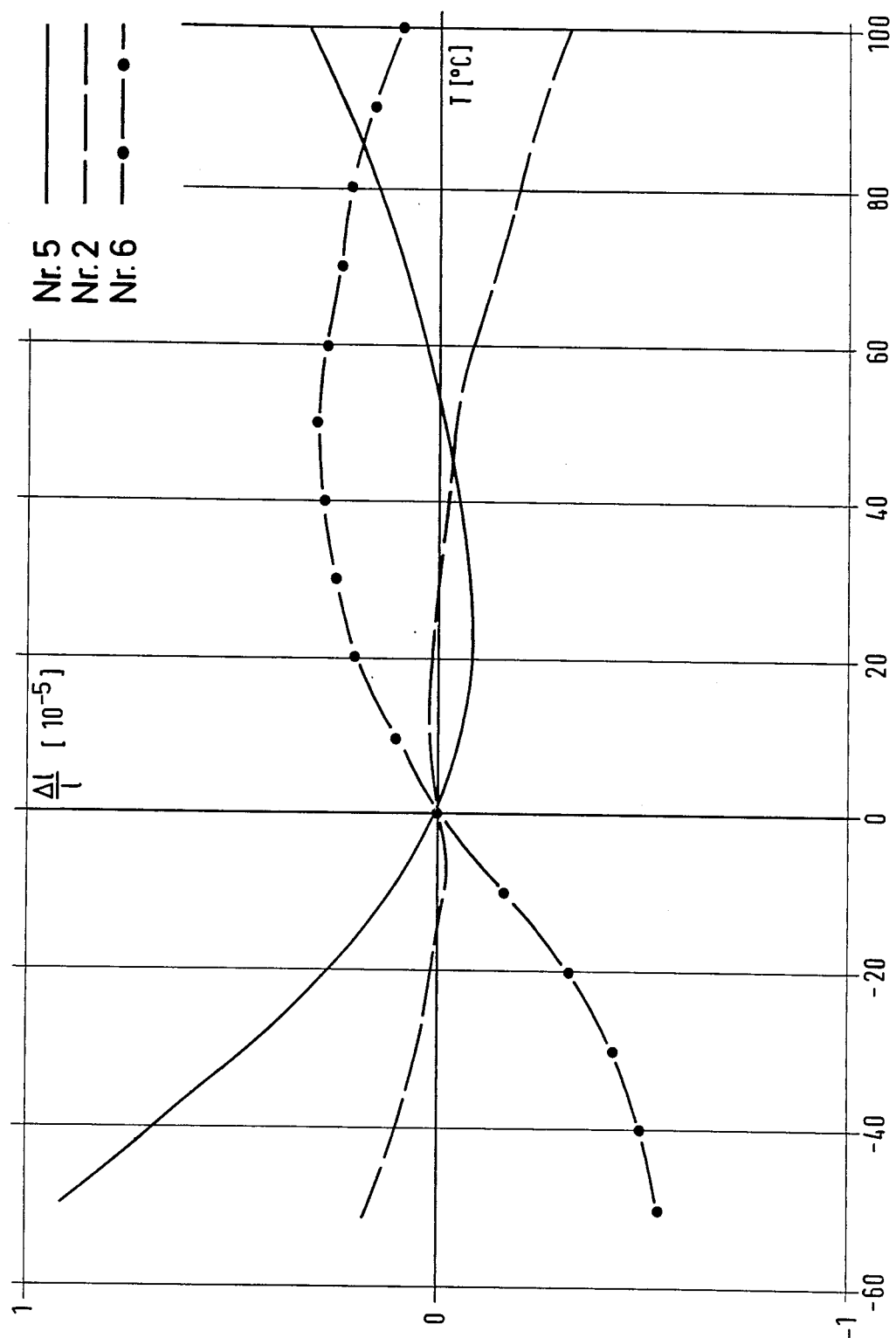

GLASS-CERAMIC WITH SPECIFIC THERMAL EXPANSION BEHAVIOR

This application is a continuation-in-part of application Ser. No. 737,007, filed May 23, 1985, abandoned.

BACKGROUND OF THE INVENTION

This invention relates to compositions useful for producing glass-ceramic base glasses which are capable of being converted by controlled crystallization into transparent glass-ceramics containing h quartz solid solution crystals and satisfying the following three requirements:

1. The difference between the maximal $\Delta l/l$ value and the minimal $\Delta l/l$ value within the temperature range between $-50°$ C. and $+100°$ C. must be less than or equal to $1 \times 10^{-5}$, that is to say $$\left| \left(\frac{\Delta l}{l}\right)_{max} - \left(\frac{\Delta l}{l}\right)_{min} \right| \leq 1 \times 10^{-5};$$

2. The linear thermal expansion coefficient within the temperature range 0° C. to +50° C., $\alpha_{0/50}$, shall be, in absolute amounts, of a value less than or equal to $0.1 \times 10^{-6}$/K; and the preferred upper limit is $0.065 \times 10^{-6}$/K.

3. The reversible adjustment of the length at 20° C. after different cooling rates from temperatures within the range of admissible applications shall be less than or equal to $0.1 \times 10^{-5}$, with a preferred upper limit of $0.14 \times 10^{-5}$, when expressed as difference in relative length at 20° C.

Numerous transparent glass-ceramics with low expansion coefficients and containing h quartz solid solution crystals in crystalline phase are known in the relevant literature. Furthermore, for special optical applications, notably for reflecting telescope support materials, glass-ceramics have been developed for which a low thermal expansion in the temperature range from $-50°$ to $+100°$ C. is of highest importance.

Such a material is described for example, in DE-PS No. 14 96 611. Its expansion behavior is characterized by a linear thermal expansion coefficient in the temperature range 0° C. to 300° C., $\alpha_{0/300}$, which is in the range $-3 \leq \alpha_{0/300} \leq 3 \times 10^{-7}$/K. In the given examples $\alpha_{0/300}$ values which are lower than $|1.0| \times 10^{-7}$/K are also listed.

DE-PS No. 19 02 432 describes conditions under which easy-to-process glasses may be melted and, by controlled crystallization, converted into the glass ceramic state to produce transparent glass-ceramics having low linear thermal expansion coefficients. According to this disclosure, it is possible to obtain compositions for which the linear thermal expansion coefficients for the temperature range $-30°$ C. to $+70°$ C., $\alpha_{-30/70}$, could be adjusted to $0 \pm 0.15 \times 10^{-6}$/K by ceramicizing in a wide range from 750° C.$\leq T \leq$870° C. and from 4 h$\leq$t$\leq$100 h. This last condition is of great importance because it guarantees the achievement of one and the same $\alpha$-value even for large castings for which homogeneous temperature distribution can be only conditionally obtained even at very slow heating-up rates.

The characterizing criteria for glass-ceramic materials for optical applications which had been applied in the above patent specifications frequently fail to meet modern demands concerning length constancy. Nowadays, instead of specifying one single value for the linear thermal expansion coefficient in a given temperature range, it is necessary to apply the three criteria described at the outset. These characterize the length- and form-constancy.

If the commercial glass-ceramics CERVIT and ZERODUR are tested, it will be found that neither is capable of simultaneously satisfying the aforementioned requirements. The papers by S. F. Jacobs, M. A. Norton, J. W. Berthold III: *Thermal Expansion*, 1973; AIP Conf. Proc. No. 17, p. 280–293 and J. W. Berthold III, S. F. Jacobs: Appl. Opt. 15 (1976) p. 2344–2347, show that CERVIT fails to meet requirement 1. From the paper by S. J. Bennett: J. Phys. E. Vol. 10 (1977), p. 525–530, it follows that ZERODUR fails to satisfy requirement 3.

SUMMARY OF THE INVENTION

Therefore, it is an object of the present invention to provide glass-ceramic compositions and ceramicizing conditions for the corresponding base glasses, whereby the three specified requirements on expansion behavior are actually satisfied.

It is a further object to satisfy the additional requirement that the temperature corresponding to a viscosity of $10^{+4}$ dPa s, which is hereinafter called the $V_A$ value, shall be below 1300° C. in order that the base glasses shall be readily workable.

Upon further study of the specification and appended claims, further objects and advantages of this invention will become apparent to those skilled in the art.

These objects have been achieved by providing glass ceramics containing h-quartz solid solution crystals, wherein 1. The difference between the maximal $\Delta l/l$ value and the minimal $\Delta l/l$ value within the temperature range between $-50°$ C. and $+100°$ C. is less than or equal to $1 \times 10^{-5}$ (absolute value)

2. The linear thermal expansion coefficient $\alpha$ within the temperature range between 0° C. and +50° C. has an absolute value less than or equal to $0.1 \times 10^{-6}$/K, and 3. The reversible adjustment of the length at 20° C. following different cooling rates from temperatures in the range of admissible applications is less than or equal to $0.1 \times 10^{-5}$ (expressed as difference in relative length at 20° C.) wherein their base-glasses have the following composition in weight percent:

| | General | Preferred | |
|---|---|---|---|
| $SiO_2$ | 50.0–65.0 | 53.0–63.0 | |
| $Al_2O_3$ | 18.0–27.0 | 20.0–24.0 | |
| $P_2O_5$ | 0–10.0 | 0–8.0 | |
| $B_2O_3$ | 0–1.0 | | |
| $Li_2O$ | 2.5–4.0 | 2.5–4.0 | |
| $Na_2O$ | –2.0 | | |
| $K_2O$ | 0–2.0 | 0–1.5 | $\Sigma K_2O + Na_2O$ |
| $MgO$ | 0–0.5 | | |
| $ZnO$ | 1.0–5.0 | 1.5–3.5 | |
| $CaO$ | –4.0 | 0–2.0 | |
| $BaO$ | 1.0–5.0 | 1.0–3.0 | |
| $TiO_2$ | –5.0 | 0–3.0 | |
| $ZrO_2$ | –3.0 | 0–2.0 | |
| $As_2O_3$ | 0–1.5 | 0–1.0 | |

$\Sigma SiO_2, Al_2O_3, P_2O_5 = 83–87$

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein:

FIG. 1 shows the $\Delta l/l$ curves of several glass-ceramic compositions.

DETAILED DESCUSSION

Requirements 1. and 3. above are definitions based on the experiments from which this invention was derived. Analogous experiments have been described previously, e.g., in Jacobs, et al. Appl. Opt. 23, 17, 3014 (1984), especially FIG. 3 (non-closed loop).

With respect to the determination of the difference in relative length at room temperature following different cooling rate conditions, it was found that for the materials of this invention, the cooling rate in the temperature range from 150° C. to 350° C. is significant for adjustment of the length of a rod at room temperature. Therefore, for the determination of the difference in relative length at room temperature following different cooling rates, a comparison is made between the lengths of a rod which is approximately 100 mg long (l.) and has a diameter of approximately 5 mm after cooling at 6° C./h (rate 1) from 350° C. to 20° C. and after cooling by air quenching (rate 2) from 350° C. to 20° C., i.e., $$\Delta l = l_1^{l_1} - l_2 << l_1$$

The foregoing discussion is not intended to limit in any way the temperatures to which the glass-ceramics of this invention can be exposed. The glass-ceramics of this invention will be useful at higher temperatures where desirable. The value of 350° C. is involved here due to the fact that cooling down from temperatures higher than 350° C. does not additionally affect requirement 3. The effect expressed by requirement 3. relates to the temperature range of 130°–320° C.

Whereas the abovementioned test relates to a glass rod; it is implicit that the glass-ceramics of the present invention can be formed into other self-supporting, substantially homogeneous bodies containing h-quartz solid solution crystals throughout.

The new glasses may comprise the components $SiO_2$, $B_2O_3$ $Al_2O_3$, $P_2O_5$, $Li_2O$, $Na_2O$, $K_2O$, $MgO$, $CaO$, $BaO$, $ZnO$, $ZrO_2$, $TiO_2$, $As_2O_3$ and $Sb_2O_3$. $P_2O_5$, $TiO_2$ and $ZrO_2$ act more or less intensively as nuclei-forming agents for the initiation and promotion of crystallization. As to the quantity of nucleating agents, it is implicit that there must be a sufficient amount so as to form crystallites throughout the self-supporting, substantially homogeneous glass-ceramic; however, it is preferred that the minimum total of $TiO_2$ and $ZrO_2$ is at least 3.0% by weight of the glass-ceramic, and more preferably at least 3.3 weight %. $As_2O_3$ and/or $Sb_2O_3$ serve to refine the melts as usual. The remaining components, by the described mixture percentages, determine the crystal phases precipitating during the ceramicizing process and thus the properties of the resulting glass ceramics.

Surprisingly, it was found that the problem of insufficient reversible adjustment of length at room temperature after different cooling rates from temperatures in the above specified range is directly correlated to the MgO-content: the lower the MgO content, the lower also becomes the difference in relative length at room temperature following different cooling rates. Thus, it is clearly evident that the composition of glass ceramic base glass which should satisfy the aforementioned requirements, should optimally comprise no, or only very little, MgO.

The further problem resided therefore in finding a composition range in which relative length variation $\Delta l/l$ within the temperature range $-50°$ C. to $100°$ C., hereinafter briefly called the $\Delta l/l$ curve, is of approximately linear dependence and in which $\alpha_{0/50}$ is close to zero. Now it is found that for a given composition satisfying the $\alpha_{0/50}$ requirement, most of the mentioned components can be varied only within very narrow limits, that is to say by a few 1/10 weight percent if $\alpha_{0/50}$ is to remain approximately zero, and that these very small variations hardly affect the curvature of the $\Delta l/l$ curve.

The compositions according to the present invention are within the following range (wt.%):

$SiO_2$: 50.0–65.0
$Al_2O_3$: 18.0–27.0
$B_2O_3$: 0–1.0
$P_2O_5$: 0–10.0
$Li_2O$: 2.5–4.0
$Na_2O$: 0–2.0
$K_2O$: 0–2.0
$MgO$: 0–0.5
$ZnO$: 1.0–5.0
$CaO$: 0–4.0
$BaO$: 1.0–5.0
$TiO_2$: 0–5.0
$ZrO_2$: 0–3.0
$As_2O_3$: 0–1.5

$Sb_2O_3$ is an equivalent of $As_2O_3$ for use in this invention.

The preferred compositions of the invention, are, on a weight basis:

$SiO_2$: 57.0–59.0
$Al_2O_3$: 21.5–23.5
$P_2O_5$: 4.5–5.5
$Li_2O$: 3.3–3.7
$Na_2O$: 0.80–1.0
$ZnO$: 1.7–2.1
$CaO$: 1.8–2.0
$BaO$: 2.4–2.6
$TiO_2$: 1.8–2.2
$ZrO_2$: 1.5–1.9
$As_2O_3$: 0.40–0.80

The glass-ceramics of this invention are conventionally produced according to conventional processing conditions and considerations, e.g., as exemplified below, for preparing glass-ceramics containing h-quartz solid solution crystals; see, e.g., H. Scheidler, Herstellung und Eigenschaften von Glaskeramik-Werkstoffen, *Silikat Journal*, 11 (1972), 6, S. 144–149.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The following ceramicizing program was applied for the comparative characterization of the glass ceramics of this invention: heating up of the base glass composition at 4° C./min to 730° C., holding for 1 h at 730° C., further heating at 4° C./min up to 850° C., holding for 1.5 h at 850° C., and cooling to room temperature by switching off the furnace.

FIG. 1 shows the $\Delta l/l$ curves, i.e., the variation of $\Delta l/l$ in dependence of the temperature for three glass ceramics of different compositions. For the purpose of further explanation of the invention, Table 1 lists the compositions of 12 glass ceramic base glasses. Table 2 contains some properties of the glasses and the corresponding glass ceramic products which are important for the purpose of this invention.

The row listing the $V_A$ values shows that most compositions have a $V_A$ value below 1300° C. Thus, the aim of providing glass ceramic base glasses which can be easily worked has been achieved. In the case of Example 4, the $V_A$ value of 1235° C. is in fact far below 1300° C. Moreover, this glass presented no problems in melting and further processing.

The first four examples all satisfy the condition: $SiO_2 + Al_2O_3 + P_2O_5 = 84.5$ weight percent. These examples satisfy the requirement $|(\Delta l/l) \max - (\Delta l/l) \min| \leq 1 \times 10^{-5}$ though there are some considerable variations in the percentages of the individual components; these examples further reveal that the variations in the $\alpha_{0/50}$-value may be compensated by minor modifications in the other components, in particular $Li_2O$, $ZnO$ and $CaO$ and $BaO$.

Examples 2, 5 and 6 illustrate how the curvature of the $\Delta l/l$ curve may be influenced by an exchange of $Al_2O_3$ against $P_2O_5$ while the $SiO_2$ content is constant. Since the exchange of $Al_2O_3$ against $P_2O_5$ gives rise to a variation in the $\alpha_{0/50}$ value, the latter was corrected to approximately zero value with the aid of the other components. To illustrate this situation the $\Delta l/l$-curves of these three examples are shown in FIG. 1.

It is evident from examples 2, 7, 8 and 9 that it is also possible for specified combined $SiO_2 + Al_2O_3 + P_2O_5$ contents of 85.5 and 86.55 weight percent to find components wherein the associated glass ceramics satisfy the three specified requirements in respect of expansion behavior. It is also evident from these examples how the components of the glasses can be varied if it is desired to change over to compositions with combined $SiO_2 + Al_2O_3 + P_2O_5$ contents smaller than 84.5 or greater than 86.5.

Lastly, a comparison of examples 10-12 shows how the relative length difference at room temperature following different cooling rates is influenced by the MgO-content. It will be seen that this value increases continuously with increasing MgO-content. As can be seen, for the particular composition involved, amounts of MgO of 0.2 and 0.3 wt.% cause the specified requirements to be exceeded.

As can be seen, for a given composition of $SiO_2 + AlO_2 + P_2O_5$, there will be combinations of the other components of this invention which will produce an overall composition meeting the three stated requirements. These combinations are readily determinable in accordance with this disclosure and its guidelines, perhaps with a few routine orientation experiments.

TABLE 1

|  | 1 | 2 | 3 | 4 | 5 | 6 | 7 | 8 | 9 | 10 | 11* | 12* |
|---|---|---|---|---|---|---|---|---|---|---|---|---|
| $SiO_2$ | 63.00 | 61.00 | 57.00 | 53.00 | 61.00 | 61.00 | 61.50 | 60.00 | 59.70 | 57.00 | 57.00 | 57.00 |
| $Al_2O_3$ | 21.50 | 21.50 | 22.50 | 23.50 | 22.50 | 20.50 | 21.50 | 22.50 | 23.40 | 22.50 | 22.50 | 22.50 |
| $P_2O_5$ | — | 2.00 | 5.00 | 8.00 | 1.00 | 3.00 | 2.50 | 3.00 | 3.45 | 5.00 | 5.00 | 5.00 |
| $Li_2O$ | 2.80 | 3.20 | 3.50 | 3.80 | 3.00 | 3.50 | 3.20 | 3.00 | 3.05 | 3.50 | 3.50 | 3.50 |
| $Na_2O$ | 0.90 | 0.70 | 0.70 | 0.70 | 0.70 | 0.70 | 0.70 | 0.70 | 0.70 | 0.70 | 0.70 | 0.70 |
| $K_2O$ | — | — | — | — | — | — | — | — | 0.40 | — | — | — |
| MgO | — | — | — | — | — | — | — | — | — | 0.10 | 0.20 | 0.30 |
| ZnO | 3.20 | 2.40 | 2.10 | 1.80 | 2.60 | 2.20 | 2.40 | 2.60 | 2.45 | 2.10 | 2.10 | 2.10 |
| CaO | 1.50 | 1.40 | 2.00 | 2.00 | 1.80 | 1.60 | 1.50 | 1.00 | 0.75 | 2.00 | 2.00 | 2.00 |
| BaO | 2.60 | 2.90 | 2.50 | 2.50 | 2.70 | 2.90 | 2.00 | 2.50 | 1.30 | 2.50 | 2.50 | 2.50 |
| $TiO_2$ | 1.90 | 2.30 | 2.30 | 2.30 | 2.30 | 2.30 | 2.30 | 1.90 | 2.10 | 2.30 | 2.30 | 2.30 |
| $ZrO_2$ | 1.80 | 1.40 | 1.40 | 1.40 | 1.40 | 1.40 | 1.40 | 1.80 | 1.85 | 1.40 | 1.40 | 1.40 |
| $As_2O_3$ | 0.80 | 0.80 | 0.80 | 0.80 | 0.80 | 0.80 | 0.80 | 0.80 | 0.90 | 0.80 | 0.80 | 0.80 |

*these examples are not part of the invention

TABLE 2

|  | 1 | 2 | 3 | 4 | 5 | 6 | 7 | 8 | 9 | 10 | 11* | 12* |
|---|---|---|---|---|---|---|---|---|---|---|---|---|
| $V_A$ in °C. | 1297 | 1297 | 1272 | 1235 |  | 1287 |  | 1306 | 0.060 |  | 1252 |  |
| $\alpha_{0/50}$ in $10^{-6}/K$ | 0.009 | 0.027 | −0.037 | +0.027 | −0.009 | +0.056 | −0.058 | −0.011 | −0.063 | +0.008 | +0.079 | +0.134 |
| $\left\|\left(\frac{\Delta l}{l}\right)_{max} - \left(\frac{\Delta l}{l}\right)_{min}\right\|$ in $10^{-5}$ | 0.61 | 0.48 | 0.56 | 0.45 | 1.00 | 0.84 | 0.77 | 0.35 | 0.900 1.11 | 0.31 | 1.43 | 1.77 |
| relative length difference at room temperature after cooling at 6° C./h and by air quenching from 350°C. in $10^{-5}$ | −0.05 | −0.09 | 0.05 | +0.10 | −0.07 | −0.11** | −0.02 | +0.04 | +0.08 | +0.08 | +0.31 | +0.42 |

*these examples are not part of the invention
**range of reproducibility ± 0.01 · $10^{-5}$

EXAMPLE 13

The following example is directed to the preferred compositions of the invention:
$SiO_2$: 58.00
$Al_2O_3$: 22.70
$P_2O_5$: 4.90

Li$_2$O: 3.50
Na$_2$O: 0.90
ZnO: 1.95
CaO: 1.90
BaO: 2.55
TiO$_2$: 2.05
ZrO$_2$: 1.65
As$_2$O$_3$: 0.55
V$_A$ in °C.: 1272
α0.50 in 10$^{-6}$/K: −0.052

$$\left[\frac{\Delta l}{l}\right]_{max.} - \left[\frac{\Delta l}{l}\right]_{min.} \text{ in } 10^{-5} 0.79$$

relative length difference at room temperature after cooling at 6° C./h and by quenching from 350° C. in 10$^{-5}$: −0.10

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A transparent self-supporting, substantially homogeneous glass-ceramic body containing h-quartz solid solution crystals throughout, wherein
   a. the expression based on the difference between the maximal Δl/l value and the minimal value Δl/l, $$\left| \left(\frac{\Delta l}{l}\right)_{max} - \left(\frac{\Delta l}{l}\right)_{min} \right|$$

within the temperature range between −50° C. and +100° C., is ≦1×10$^{-5}$,
   b. the linear thermal expansion coefficient within the temperature range between 0° C. and +50° C. α0/50 has an absolute value ≦0.1×10$^{-6}$/K, and
   c.

$$\frac{l_1(\text{after cooling by rate 1}) - l_2(\text{after cooling by rate 2})}{l_1}$$

has a value ≦0.1×10$^{-5}$, wherein l is the length, rate 1 is 6° C./hr from 350° C. to 20° C. and rate 2 is that of air quenching from 350° C. to 20° C., consisting essentially of in weight %:
   SiO$_2$: 50.0–65.0
   Al$_2$O$_3$: 18.0–27.0
   B$_2$O$_3$: 0–1.0
   P$_2$O$_5$: 0–10.0
   Li$_2$O: 2.5–4.0
   Na$_2$O: 0–2.0
   K$_2$O: 0–2.0
   MgO: 0–0.5
   ZnO: 1.0–5.0
   CaO: 0–4.0
   BaO: 1.0–5.0
   TiO$_2$: 0–5.0
   ZrO$_2$: 0–3.0
   As$_2$O$_3$: 0–1.5 or
   Sb$_2$O$_3$:
   and having sufficient nucleating agents to form crystallites throughout the body.

2. A glass-ceramic of claim 1 essentially free of MgO.
3. A glass-ceramic of claim 1 consisting essentially of 0–0.10 wt. % MgO.
4. A glass-ceramic of claim 1 wherein V$_A$ is ≦1310° C.
5. A glass-ceramic of claim 1 wherein the total amount of SiO$_2$+Al$_2$O$_3$+P$_2$O$_5$ is about 83–87 Wt. %.
6. A glass-ceramic of claim 5 wherein V$_A$ is ≦1310° C.
7. A glass-ceramic of claim 1 essentially free of K$_2$O.
8. A glass-ceramic of claim 1 prepared by heat treating the base glass composition at a rate of about 4° C./min up to about 730° C., maintaining it at about that temperature for about 1 hr, further heating it at a rate of about 4° C./hr up to about 850° C., maintaining it at about 1.5 h at that temperature and cooling to room temperature by turning off the source of heat.
9. A glass-ceramic of claim 2 essentially free of K$_2$O.
10. A glass-ceramic of claim 1 wherein the amount of TiO$_2$ is at least 1.9 wt.% and of ZrO$_2$ at least 1.4 wt.%.
11. A glass ceramic of claim 9 wherein the amount of TiO$_2$ is at least 1.9 wt.% and of ZrO$_2$ at least 1.4 wt.%.
12. A glass ceramic of claim 10 wherein the amount of TiO$_2$ is at least 2.3 wt.%.
13. A glass ceramic of claim 11 wherein the amount of TiO$_2$ is at least 2.3 wt.%.
14. A glass-ceramic according to claim 1, consisting essentially of, in weight %:
   SiO$_2$: 53.0–63.0
   Al$_2$O$_3$: 20.0–24.0
   P$_2$O$_5$: 0–8.0
   SiO$_2$+Al$_2$O$_3$+P$_2$O$_5$: 83.0–87.0
   Li$_2$O: 2.5–4.0
   K$_2$O+Na$_2$O: 0–1.5
   ZnO: 1.5–3.5
   CaO: 0–2.0
   BaO: 1.0–3.0
   TiO$_2$: 0–3.0
   ZrO$_2$: 0–2.0
   As$_2$O$_3$: 0–1.0.
15. A transparent glass-ceramic containing h-quartz solid solution crystals, wherein
   a. the expression based on the difference between the maximal Δl/l value and the minimal value Δl/l, $$\left| \left(\frac{\Delta l}{l}\right)_{max} - \left(\frac{\Delta l}{l}\right)_{min} \right|$$

within the temperature range between −50° C. and +100° C., is ≦1×10$^{-5}$,
   b. the linear thermal expansion coefficient within the temperature range between 0° C. and +50° C. α0/50, has an absolute value ≦0.1×10$^{-6}$/K, and
   c.

$$\frac{l_1(\text{after cooling by rate 1}) - l_2(\text{after cooling by rate 2})}{l_1}$$

has a value ≦0.1×10$^{-5}$, wherein l is the length, rate 1 is 6° C./hr from 350° C. to 20° C. and rate 2 is that of air quenching from 350° C. to 20° C., consisting essentially of in weight %:

SiO$_2$: 50.0–65.0
Al$_2$O$_3$: 18.0–27.0
B$_2$O$_3$: 0–1.0
P$_2$O$_5$: 0–10.0
Li$_2$O: 2.5–4.0
Na$_2$O: 0–2.0
K$_2$O: 0–2.0
MgO: 0–0.5
ZnO: 1.0–5.0
CaO: 0–4.0
BaO: 1.0–5.0
TiO$_2$: 1.9–5.0
ZrO$_2$: 1.4–3.0
As$_2$O$_3$: 0–1.5 or
Sb$_2$O$_3$.

16. A transparent glass-ceramic containing h-quartz solid solution crystals, wherein
 a. the expression based on the difference between the maximal Δ1/1 value and the minimal value Δ1/1, $$\left| \left(\frac{\Delta l}{l}\right)\text{max} - \left(\frac{\Delta l}{l}\right)\text{min} \right|$$

within the temperature range between −50° C. and +100° C., is $\leq 1\times 10^{-5}$,
 b. the linear thermal expansion coefficient within the temperature range between 0° C. and +50° C. α0/50, has an absolute value $\leq 0.1\times 10^{-6}$/K, and
 c.

$$\frac{l_1(\text{after cooling by rate 1}) - l_2(\text{after cooling by rate 2})}{l_1}$$

has a value $\leq 0.1\times 10^{-5}$, wherein 1 is the length, rate 1 is 6° C./hr from 350° C. to 20° C. and rate 2 is that of air quenching from 350° C. to 20° C., consisting essentially of in weight %:
SiO$_2$: 50.0–65.0
Al$_2$O$_3$: 18.0–27.0
B$_2$O$_3$: 0–1.0
P$_2$O$_5$: 0–10.0
Li$_2$O: 2.5–4.0
Na$_2$O: 0–2.0
K$_2$O: 0–2.0
MgO: 0–0.5
ZnO: 1.0–5.0
CaO: 0–4.0
BaO: 1.0–5.0
TiO$_2$: 0–5.0
ZrO$_2$: 0–3.0
As$_2$O$_3$: 0–1.5 or
Sb$_2$O$_3$
and wherein the minimum total of TiO$_2$ and ZrO$_2$ is 3.0 weight %.

17. A glass-ceramic according to claim 16 wherein the minimum total of TiO$_2$ and ZrO$_2$ is 3.3 weight %.

18. A glass ceramic according to claim 16, which is a glass-ceramic body containing h-quartz solid solution crystals throughout.

19. A glass-ceramic according to claim 16, consisting essentially of, in weight %:
SiO$_2$: 53.0–63.0
Al$_2$O$_3$: 20.0–24.0
P$_2$O$_5$: 0–8.0
SiO$_2$+Al$_2$O$_3$+P$_2$O$_5$: 83.0–87.0
Li$_2$O: 2.5–4.0
K$_2$O+Na$_2$O: 0–1.5
ZnO: 1.5–3.5
CaO: 0–2.0
BaO: 1.0–3.0
TiO$_2$: 0–3.0
ZrO$_2$: 0–2.0
As$_2$O$_3$: 0–1.0.

20. A glass according to claim 16, a species of which being produced by the following steps:
 (i) Selecting a composition from the state ranges of SiO$_2$, Al$_2$O$_3$ and P$_2$O$_5$
 (ii) Varying the amount of at least one component from the group Li$_2$O, ZnO, CaO, BaO to adjust the α0/50-value to a value lower than $0.1\times 10^{-6}$/K;
 (iii) Exchanging Al$_2$O$_3$ against P$_2$O$_5$ so as to obtain a linearization of the Δ1/1-curve.;
 (iv) If necessary, slightly varying other components of the composition thus obtained to compensate for an undesirable minor increase of the absolute value of α0/50.

21. A transparent glass-ceramic containing h-quartz solid solution crystals, wherein
 a. the expression based on the difference between the maximal Δ1/1 value and the minimal value Δ1/1

$$\left| \left(\frac{\Delta l}{l}\right)\text{max} - \left(\frac{\Delta l}{l}\right)\text{min} \right|$$

within the temperature range between −50° C. and +100° C., is $\leq 0.1\times 10^{-5}$,
 b. the linear thermal expansion coefficient within the temperature range between 0° C. and +50°, α0/50, has an absolute value $\leq 0.1\times 10^{-6}$/K, and
 c.

$$\frac{l_1(\text{after cooling by rate 1}) - l_2(\text{after cooling by rate 2})}{l_1}$$

has a value $\leq 0.1\times 10^{-5}$, wherein 1 is the length, rate 1 is 6°/hr. from 350° C. to 20° C. and rate 2 is that of air quenching from 350° C. to 20° C., consisting essentially of in weight %:
SiO$_2$: 57.0–59.0
Al$_2$O$_3$: 21.5–23.5
P$_2$O$_5$: 4.5–5.5
Li$_2$O: 3.3–3.7
Na$_2$O: 0.80–1.0
ZnO: 1.7–2.1
CaO: 1.8–2.0
BaO: 2.4–2.6
TiO$_2$: 1.8–2.2
ZrO$_2$: 1.5–1.9
As$_2$O$_3$: 0.40–0.80
and wherein the minimum total of TiO$_2$ and ZrO$_2$ is 3.0 wt. %.

22. A transparent, self-supporting, substantially homogenous glass-ceramic body containing h-quartz solid solution crystals throughout, wherein
 a. the expression based on the difference between the maximal Δ1/1 value and the minimal value Δ1/1, $$|\Delta l/l\ \text{max} - \Delta l/l\ \text{min}|,$$

within the temperature range between $-50°$ C. and $+100°$ C., is $\leq 0.1 \times 10^{-5}$, b. the linear thermal expansion coefficient within the temperature range between $0°$ C. and $+50°$, $\alpha_{0/50}$, has an absolute value $\leq 0.1 \times 10^{-6}$/K, and c.
$$\frac{l_1(\text{after cooling by rate 1}) - l_2(\text{after cooling by rate 2})}{l_1}$$

has a value $\leq 1.0 \times 10^{-5}$, wherein l is the length, rate 1 is $6°$/hr from $350°$ C. to $20°$ C. and rate 2 is that of air quenching from $350°$ C. to $20°$ C., consisting essentially of in weight %:

SiO$_2$: 50.0–65.0
Al$_2$O$_3$: 18.0–27.0
B$_2$O$_3$: 0–1.0
Li$_2$O: 2.5–4.0
Na$_2$O: 0–2.0
K$_2$O: 0–2.0
MgO: 0–0.5
ZnO: 1.0–5.0
CaO: 0–4.0
BaO: 1.0–5.0
TiO$_2$: 0–5.0
ZrO$_2$: 0–3.0
As$_2$O$_3$: 0–1.5 or
Sb$_2$O$_3$ and having sufficient nucleating agents to form crystallites throughout the body and P$_2$O$_5$ is present.

23. A glass-ceramic according to claim 22, wherein the P$_2$O$_5$ is present in an amount of 1 to 8% by weight.

* * * * *